(12) United States Patent
Johnson, II et al.

(10) Patent No.: US 12,453,966 B2
(45) Date of Patent: Oct. 28, 2025

(54) PROCESS AND APPARATUS FOR REACTING FEED WITH A FLUIDIZED CATALYST WITH A REDUCTION IN CATALYST LOSS DURING STARTUP

(71) Applicant: UOP LLC, Des Plaines, IL (US)

(72) Inventors: Richard A. Johnson, II, Algonquin, IL (US); John J. Senetar, Naperville, IL (US); Sathit Kulprathipanja, Schaumburg, IL (US); Adam J. Kanyuh, Streamwood, IL (US)

(73) Assignee: UOP LLC, Rosemont, IL (US)

( * ) Notice: Subject to any disclaimer, the term of this patent is extended or adjusted under 35 U.S.C. 154(b) by 914 days.

(21) Appl. No.: 17/565,857

(22) Filed: Dec. 30, 2021

(65) Prior Publication Data
US 2023/0211331 A1    Jul. 6, 2023

(51) Int. Cl.
| | |
|---|---|
| *B01J 38/02* | (2006.01) |
| *B01J 8/18* | (2006.01) |
| *B01J 8/24* | (2006.01) |
| *C07C 5/333* | (2006.01) |

(52) U.S. Cl.
CPC ............ *B01J 38/02* (2013.01); *B01J 8/1836* (2013.01); *B01J 8/24* (2013.01); *C07C 5/333* (2013.01); *B01J 2208/00168* (2013.01); *B01J 2208/00504* (2013.01); *B01J 2208/00548* (2013.01)

(58) Field of Classification Search
CPC ..... B01J 8/1836; B01J 8/24; B01J 8/26; B01J 23/08; B01J 23/62; B01J 38/02; B01J 38/30; B01J 2208/00168; B01J 2208/00504; B01J 2208/00548; B01J 2208/00646; C07C 5/333
See application file for complete search history.

(56) References Cited

U.S. PATENT DOCUMENTS

| | | | | |
|---|---|---|---|---|
| 4,376,225 | A | * 3/1983 | Vora | ........................ C07C 5/333 |
| | | | | 585/658 |
| 5,286,380 | A | * 2/1994 | Mellen | ................. C10M 175/00 |
| | | | | 210/182 |
| 6,106,696 | A | 8/2000 | Fecteau et al. | |
| 2004/0199039 | A1 * | 10/2004 | Brophy | .................. B01F 33/30 |
| | | | | 585/660 |

(Continued)

FOREIGN PATENT DOCUMENTS

| | | | |
|---|---|---|---|
| CN | 109280561 A | 1/2019 | |
| CN | 110740984 A | 1/2020 | |
| WO | WO-2014167473 A1 | * 10/2014 | ............... B01J 23/92 |

OTHER PUBLICATIONS

Boyce, M. P. et al., 1997, Perry's Chemical Engineers' Handbook, 7th edition, McGraw-Hill, 2640 pp. (Office action cites p. 10-87). (Year: 1997).*

(Continued)

*Primary Examiner* — Brian A Mccaig
(74) *Attorney, Agent, or Firm* — Paschall & Associates, LLC; Mark Goldberg

(57) ABSTRACT

A fluidized catalytic reactor connected to a start-up heater is provided. The start-up heater provides sufficient heat to a catalyst containing stream to gradually increase the feed temperature. This allows for a critical volumetric flow rate to be achieved so that catalyst can be recovered from product instead of being entrained in product.

11 Claims, 2 Drawing Sheets

(56) References Cited

U.S. PATENT DOCUMENTS

2011/0243798 A1\* 10/2011 Myers .................... C10G 45/00
  422/142
2015/0210613 A1   7/2015 Oleksy
2016/0214858 A1   7/2016 Cooper et al.
2016/0346761 A1\* 12/2016 Kanazirev ............ B01J 20/3458

OTHER PUBLICATIONS

Search Report and Written Opinion for PCT/US2022/082222 dated Apr. 26, 2023.

\* cited by examiner

PROCESS AND APPARATUS FOR REACTING FEED WITH A FLUIDIZED CATALYST WITH A REDUCTION IN CATALYST LOSS DURING STARTUP

FIELD

The field is the reaction of feed with fluid catalyst. The field may particularly relate to reacting a paraffin feed with a fluid dehydrogenation catalyst with improvements to the startup of the reactor.

BACKGROUND

Light olefin production is vital to the production of sufficient plastics to meet worldwide demand. Paraffin dehydrogenation (PDH) is a process in which light paraffins such as ethane and propane can be dehydrogenated to make ethylene and propylene, respectively. Dehydrogenation is an endothermic reaction which requires external heat to drive the reaction to completion.

Dehydrogenation catalysts may incorporate a dehydrogenation metal with a molecular sieve or an amorphous material. The catalyst must be sufficiently robust and appropriately sized to be able to resist the attrition expected in a fluidized system.

In PDH reactions with a fluidized catalyst, coke can deposit on the catalyst while catalyzing the reaction. The catalyst may be regenerated in a catalyst regenerator by combusting coke from the catalyst in the presence of oxygen. The hot regenerated catalyst may then be transferred back to the reactor to catalyze the reaction.

Start-up of a reactor requires sufficient heat to be provided to the reactor to raise the temperature of the reactor vessel and its contents (catalyst and internals) to the reaction temperature. This warm-up period is normally controlled by gradually increasing the feed to the reactor and/or gradually increasing the feed temperature to warm the reactor at a predetermined rate. Heating of a gas-solid fluidized-bed reactor poses a particular challenge in that a critical volumetric flow rate of the vapor (gas) is required to enable catalyst recovery in cyclones. Below this critical flow rate, cyclones are ineffective and result in large amounts of catalyst being lost (entrained) with the product. This excessive catalyst loss during start-up poses operational difficulties downstream as well as leading to loss of valuable catalyst in the reactor system. Reactor feeds and product recovery equipment are generally sized for the maximum plant capacity. As volumetric flow rate is proportional to absolute temperature, the reactor volumetric flow rate is lower when the reactor is below the targeted operating conditions. Even when operating at the feed flow rate for maximum plant capacity, the volumetric flow rate at low reactor temperature can be below the minimum critical flow required for the cyclones. Various means have been used commercially to increase the volumetric flow rate to promote good gas-solid separation. These methods include the addition of an auxiliary feed stream such as steam which can be condensed downstream and/or the ability to lower pressure in the reactor to increase the volumetric feed rate at lower temperature during start-up. Fluidized-bed paraffin dehydrogenation is designed to operate at low pressure to increase yields and does not leave any margin for reducing the pressure during start-up. In addition, the amount of auxiliary feed would need to be excessive and greatly increase the utilities requirements for the plant. A means is desired to increase the volumetric feed in the reactor during start-up without providing additional feed.

There is a need, therefore, for improved methods to avoid catalyst losses during start-up for a fluidized bed paraffin dehydrogenation reactor.

BRIEF SUMMARY

A fluidized catalytic reactor is provided with an improved start-up process. A reactor system comprising a reactor for contacting a reactant stream with a catalyst, said system comprising a reactor and a start-up heater having lines for a feed stream to be sent to said reactor. The start-up heater may be located downstream from a feed-effluent heat exchanger or from the reactor. The start-up heater may a fired heater, heat exchanger, a hot oil heater or another type of heater known to one of skill in the art.

In the process of start-up there is a portion of a feed, or all of the feed circulated through a start-up heater to heat said feed to a temperature of at least 240 C. This feed may be a fresh feed or a recycled feed. The feed is at a volumetric flow rate at least 60% of a design flow rate for said reactor or up to at least 85% of a design flow rate for said reactor.

The feed stream is increased by the start-up heater to at least a temperature of at least 240° C. before a heated catalyst feed is sent from a regeneration unit to said reactor. The start-up heater heats the reactor feed stream until an exit temperature from said reactor for a feed effluent exceeds a predetermined temperature. The start-up heater provides sufficient heat to fluidize said catalyst containing stream sufficiently to allow for at least a 3 ft/sec superficial gas velocity in the reaction section and at least 60% of the reactor cyclone inlet velocity. The reactor may be a fluidized bed paraffin dehydrogenation reactor. The heater may be a heat exchanger or a hot oil heater or fired heater.

DETAILED DESCRIPTION

A process and apparatus have been developed that uses a start-up heater to increase the temperature of the feed vapor to maintain a critical volumetric flow rate through the reactor required for gas-solid separation that prevents loss of catalyst. The critical volumetric flow rate is generally at or above 50% of the design flow rate for the reactor during normal operation. Circulation of feed through the reactor at or above this critical flow rate is achieved by heating the feed to a minimum of 240° C. before introducing hot catalyst from the regenerator into the reactor. As the reactor heats up, the temperature of the feed exiting the feed heater is increased until the desired feed inlet temperature is achieved. The feed heater is located downstream of a feed-effluent heat exchanger so that as the exit temperature of the reactor increases, the heat input from the feed heater decreases as additional heat is transferred to the feed via the feed-effluent heat exchanger. A number of different heaters may be used including fired heaters, heat exchangers or hot oil heaters. In addition to providing enough flow to enable the cyclones to operate, the feed heater also maintains the necessary degree of fluidization for catalyst transport to enable circulation of catalyst from the reactor to the regenerator. In this situation the volumetric flow rate of the catalyst needs to be sufficient to achieve a minimum of 3 ft/s in the primary feed-contacting zone and preferentially a minimum of 5 ft/s in the primary feed-catalyst contacting zone and at least 60% of the normal reactor cyclone inlet velocity.

The PDH catalyst is used in a dehydrogenation reaction process to catalyze the dehydrogenation of paraffins, such as ethane, propane, iso-butane, and n-butane, to olefins, such as ethylene, propylene, isobutene and n-butenes, respectively. The PDH process will be described exemplarily to illustrate the disclosed apparatus and process.

The conditions in the dehydrogenation reactor may include a temperature of about 500 to about 800° C., a pressure of about 40 to about 310 kPa and a circulated catalyst to reactor feed ratio of about 5 to about 100. The dehydrogenation reaction may be conducted in a fluidized manner such that gas, which may comprise the reactant paraffins with or without a fluidizing inert gas, is distributed to the reactor in a way that lifts the dehydrogenation catalyst in the reactor vessel while catalyzing the dehydrogenation of paraffins. During the catalytic dehydrogenation reaction, coke is deposited on the dehydrogenation catalyst leading to reduction of the activity of the catalyst. The dehydrogenation catalyst must then be regenerated.

Figure 1:
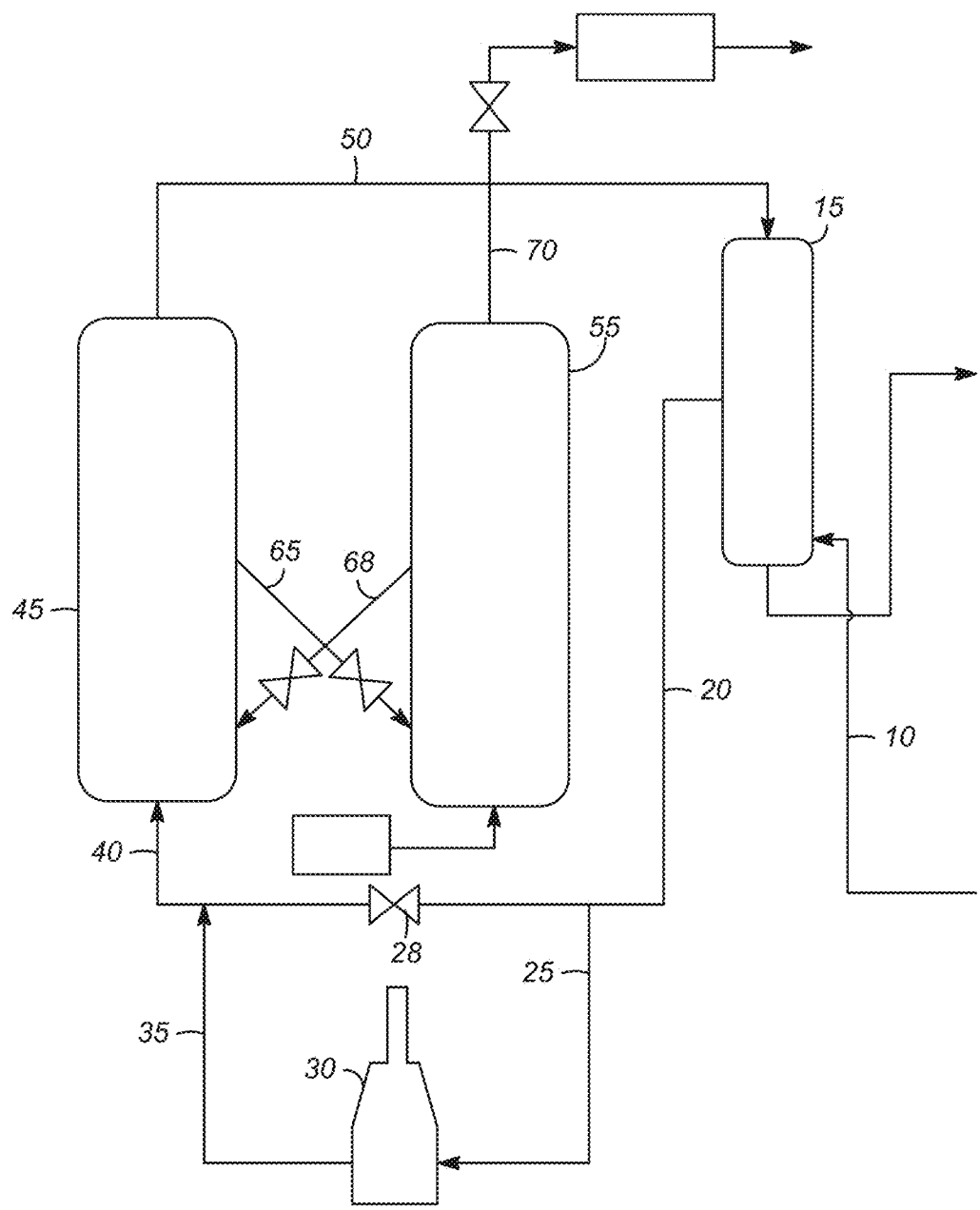
FIG. 1 is a schematic drawing of a process and apparatus of the present disclosure.

An example of the process is shown in FIG. 1 that shows the start-up heater 30 that is used to gradually increase the temperatures within the reactor until they reach about 240° C. A stream 10 comprising propane or butane, but other paraffins such as ethane may be present in the reactant stream in conjunction with or to the exclusion of other paraffins is passed through heat exchanger 15 with a stream 20 sent towards a valve 28. During start-up, all or a portion of stream 20 is sent in stream 25 to start-up heater 30. Then heated stream 35 is sent to be combined with the other portion of stream 20 to become stream 40 entering the bottom of reactor 45. Catalyst is sent through line 65 to be regenerated in regeneration unit 55 and regenerated catalyst is returned to the reactor through line 60.

Figure 2:
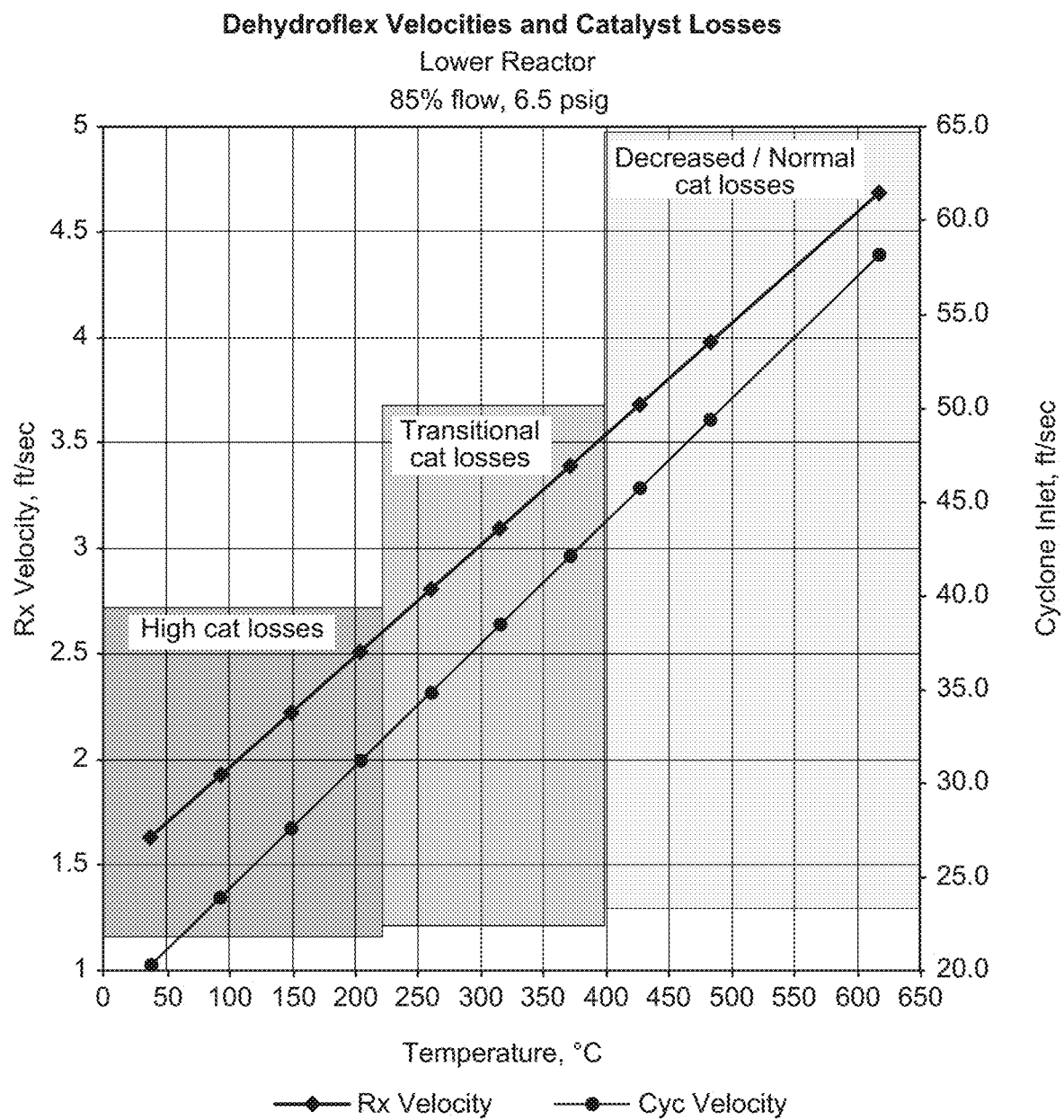
FIG. 2 is a graphical depiction of reaction flow velocity against time showing catalyst loss over time.

In FIG. 2 it is shown the effect of the use of the start-up heater over the prior art where a start-up heater is not used. In FIG. 2, is seen reactor space velocity on the y-axis and temperature on the X-axis. There are high catalyst losses until the temperature in the reactor reaches about 210-225 C. As the velocity increases in the reactor, the catalyst losses are diminished. Between about 220 C to 400 C there are transitional catalyst losses that are lower than at the lower temperatures but still higher than desired. Above about 400 C to 650 C temperatures, the catalyst loss is minimized. On the right-hand y-axis is shown the cyclone inlet velocity in feet per second. When the reactor is at low temperatures there are also low pressures as well as low velocities. At such conditions much more catalyst is lost. However, by addition of the heater, the time period when the reactor is at low temperatures and catalyst losses are high is minimized and then the catalysts are retained in the reactor.

The dehydrogenation catalyst may be of any of a variety of catalysts suitable for a fluidized bed dehydrogenation unit. The dehydrogenation catalyst selected should minimize cracking reactions and favor dehydrogenation reactions. Suitable catalysts for use herein include an active metal which may be dispersed in a porous inorganic carrier material such as silica, alumina, silica alumina, zirconia, or clay. An exemplary embodiment of a catalyst includes alumina or silica-alumina containing gallium, a noble metal, and an alkali or alkaline earth metal. In most cases, the catalyst contains gallium.

The catalyst support comprises a carrier material, a binder and an optional filler material to provide physical strength and integrity. The carrier material may include alumina or silica-alumina. Silica sol or alumina sol may be used as the binder. The alumina or silica-alumina generally contains alumina of gamma, theta and/or delta phases. The majority of the catalyst support particles may have a nominal diameter of about 20 to about 200 micrometers with the average diameter of about 50 to about 150 micrometers. There are some particles as small as 1 micron although there are normally less than 5% of the particles smaller than 1 micron. The surface area of the catalyst support is 85-140 m2/g.

The dehydrogenation catalyst may support a dehydrogenation metal. The dehydrogenation metal may be a one or a combination of transition metals. A noble metal may be a preferred dehydrogenation metal such as platinum or palladium. Gallium is an effective supporting metal for paraffin dehydrogenation. Metals may be deposited on the catalyst support by impregnation or other suitable methods or included in the carrier material or binder during catalyst preparation.

The acid function of the catalyst should be minimized to prevent cracking and favor dehydrogenation. Alkali metals and alkaline earth metals may also be included in the catalyst to attenuate the acidity of the catalyst. Rare earth metals may be included in the catalyst to control the activity of the catalyst. Concentrations of 0.001% to 10 wt % metals may be incorporated into the catalyst. In the case of the noble metals, it is preferred to use about 10 parts per million (ppm) by weight to about 600 ppm by weight noble metal. More preferably it is preferred to use 10-100 ppm by weight noble metal. The preferred noble metal is platinum. Gallium should be present in the range of 0.3 wt % to about 3 wt %, preferably about 0.5 wt % to about 2 wt %. Alkali and alkaline earth metals are present in the range of about 0.05 wt % to about 1 wt %.

The invention claimed is:

1. A reactor system comprising:
   a. a reactor for contacting a reactant stream with a catalyst;
   b. a start-up heater having lines for the reactant stream to be sent to said reactor; and
   c. a valve configured to receive a stream obtained from a feed-effluent heat exchanger,
   wherein said start-up heater provides sufficient heat to fluidize said catalyst sufficiently to allow for at least a 3 ft/sec superficial gas velocity in said reactor.

2. The reactor system of claim 1 wherein said start-up heater is located downstream from said feed-effluent heat exchanger.

3. The reactor system of claim 1 wherein said start-up heater is upstream from said reactor.

4. The reactor system of claim 1 wherein the start-up heater is a fired heater, heat exchanger or a hot oil heater.

5. A process of start-up of a reactor comprising circulating a portion of a feed through a start-up heater to heat said feed to a temperature of at least 240° C. before a heated catalyst feed is sent from a regeneration unit to said reactor, wherein said start-up heater provides sufficient heat to fluidize said heated catalyst feed sufficiently to allow for at least a 3 ft/sec superficial gas velocity in said reactor.

6. The process of claim 5 wherein said feed is at a volumetric flow rate at least 85% of a design flow rate for said reactor.

7. The process of claim 5 wherein said start-up heater heats a reactor feed stream until an exit temperature from said reactor for a feed effluent exceeds a predetermined temperature.

8. The process of claim 5 wherein said start-up heater provides sufficient heat to fluidize said heated catalyst feed sufficiently to allow for at least a 5 ft/sec superficial gas velocity in said reactor.

9. The process of claim 5 wherein said reactor is a fluidized bed paraffin dehydrogenation reactor.

10. The process of claim 5 wherein said heater is a fired heater, heat exchanger or a hot oil heater.

11. The process of claim 5 wherein said feed is at a volumetric flow rate at least 50% of a design flow rate for said reactor.

* * * * *